United States Patent Office 3,730,878
Patented May 1, 1973

3,730,878
HYDROCARBON CONVERSION CATALYST
Ernest L. Pollitzer, Skokie, Ill., assignor to Universal
Oil Products Company, Des Plaines, Ill.
No Drawing. Filed Mar. 4, 1971, Ser. No. 121,127
Int. Cl. C10g 23/02, 13/02
U.S. Cl. 208—143
9 Claims

ABSTRACT OF THE DISCLOSURE

A hydrocarbon conversion catalyst of discrete particles of (1) a porous, amorphous carrier material containing a Group VI-B metal component and (2) a porous, zeolitic carrier material containing a Group VIII metal component. Suitable for utilization in a multitude of hydroprocesses, wherein there is effected the chemical consumption of hydrogen, the principal advantage of the catalyst resides in its use for hydrotreating hydrocarbonaceous charge stocks.

APPLICABILITY OF INVENTION

The present invention encompasses a novel catalytic composite and the use thereof in the conversion of hydrocarbons. More specifically, my invention is directed toward catalytic hydroprocesses, wherein there is effected a chemical consumption of hydrogen, and especially toward hydrotreating processes designed to effect contaminant removal and/or conversion. "Hydroprocessing" is a term which has become recognized in the petroleum refining art as encompassing hydrogen-consuming processes and reactions including hydrocracking, aromatic hydrogenation, ring-opening for producing jet fuel paraffinic components, hydrorefining for nitrogen removal and olefinic hydrocarbon saturation, desulfurization (often synonymously referred to as hydrorefining) and hydrogenation. As distinguished from hydrogen-producing processes, one common attribute of the foregoing is that they are all hydrogen-consuming, and are, therefore, exothermic in nature.

Hydrogen-consuming processes differ with respect to the operating conditions selected to effect a particularly desired end result. For example, a process designed to effect the conversion of sulfurous compounds into hydrogen sulfide and hydrocarbons, will normally be effected under conditions significantly different from those employed in the conversion of ring compounds into paraffinic jet fuel components. However, both processes will involve a form of cracking and hydrogenation, and will, therefore, consume hydrogen. As hereinbefore stated, my invention is particularly adaptable for hydrotreating various hydrocarbonaceous charge stocks in order to effect contaminant removal and/or conversion. Thus, desulfurization is conducted to remove sulfurous compounds through conversion into hydrogen sulfide and hydrocarbons, whereas hydrorefining of coke-forming hydrocarbon distillates principally involves the conversion of mono- and di-olefinic hydrocarbons into saturates.

Regardless of the reaction involved, or the particular process, it is very important for the catalytic composite to exhibit the capability to perform its intended functions initially, and to perform them satisfactorily for an extended period of time. The exothermic nature of hydrogen-consuming processes attaches a certain degree of criticality to the character of the catalytic composite, since exothermicity fosters those reactions which tend to result in rapid catalyst deactivation.

OBJECTS AND EMBODIMENTS

A principal object of my invention is to provide a novel hydrocarbon conversion catalyst. A corollary objective resides in the improvement of catalyst activity and stability in hydrocarbon hydroprocesses.

Another object of my invention is to afford a more efficient hydrocarbon hydrotreating process wherein various contaminating influences are subject to removal and/or conversion.

The novel hydrocarbon conversion catalyst of the present invention, in one embodiment, comprises discrete particles of a mixture of (1) a porous amorphous carrier material containing a Group VI-B metal component and (2) a porous, zeolitic carrier material containing a Group VIII metal component. Other embodiments, directed toward the catalytic composite, involve the selection of the metal components from the aforesaid groups, the concentration thereof, still other possible catalytic constituents, the selection of the material for use as the porous, amorphous and/or zeolitic carrier etc.

Another embodiment of the present invention involves a hydrocarbon hydroprocess which comprises reacting a hydrocarbonaceous charge stock with hydrogen at hydroprocessing conditions selected to effect the chemical consumption of hydrogen and in contact with a catalytic composite of discrete particles of a mixture of (1) a porous, amorphous carrier material containing a Group VI-B metal component and (2) a porous, zeolitic carrier material containing a Group VIII metal component. Other embodiments are directed toward specific processes, operating conditions, processing techniques and applicable charge stocks.

These, as well as other objects and embodiments will be evident from the following, more detailed summary of the present invention.

SUMMARY OF INVENTION

Candor compels recognition of the fact that hydroprocessing of hydrocarbons is well known and thoroughly described in the published literature relevant to petroleum refining technology. Likewise, it must be acknowledged that exploratory research has lead to the development of a multitude of catalytic composites for use in hydrocarbon hydroprocessing. Notwithstanding the multitude of such processes, including various operating conditions and techniques, and of the catalysts for use therein, the present invention offers a novel catalytic composite which affords an improved catalytic hydroprocess as a result of a beneficial increase in catalyst efficiency. For purposes of discussion, the efficiency of a given catalyst, for use in a given process, may be measured in terms of activity, selectivity and stability. "Activity" is conveniently defined as the ability of the catalyst to convert a hydrocarbon feed stock into desired products at a specified severity level, where "severity level" alludes to the operating conditions employed—the temperature, pressure, space velocity and hydrogen concentration. "Selectivity" refers to the quantity of reactants which converted into the desired product and/or products. The term, "stability" connotes the rate of change of activity and selectivity with respect to time, the smaller rate implying the more stable catalyst.

Well known to those skilled in the art is the fact that the principal cause of catalyst deactivation, or loss of stability of a catalytic composite is associated with the formation of coke and other carbonaceous material on the surface of the catalyst during the course of the reaction. In various hydrocarbon conversion processes, especially those which are categorized as hydrogen-consuming, the operating conditions utilized, coupled with the physical and chemical characteristics of the fresh feed charge stock, tend to promote the formation of solid or semi-solid, hydrogen-poor carbonaceous material which shields the catalytically active surfaces and centers from the material being processed. Accordingly, a major effort by workers in this area continues to be the development of more active and selective catalysts which have the propensity to suppress the rate of formation of the carbonaceous material at the operating conditions employed in a particular hydrocarbon hydroprocess.

A perusal of the prior art relative to hydroprocessing catalysts indicates a predominant preference for composites comprising one or more metal components from Groups VI–B and VIII of the Periodic Table. Those metals from the iron-group, iron, cobalt and nickel, appear to be the most popular, especially when employed in combination with a Group VI–B metal component. Reference to various metals by group number, in the present specification and/or appended claims, is intended to allude to those metals indicated in the Periodic Table of the Elements, E. H. Sargent and Company, 1964.

Investigations have indicated that the Group VI–B metals, particularly molybdenum and tungsten, are excellent promoters for effecting hydroprocessing reactions, especially for removing and/or converting contaminating influences. The addition of the iron-group metal, especially cobalt and nickel, has been shown to increase the activity, for example through an increase in the rate at which desulfurization is effected. The increase in activity stems primarily from the ability of the Group VIII metals to function as the prime mover in the creation of hydrogen atoms. Increased activity is, however, simultaneously accompanied by a noticeable decrease in catalyst stability. My investigations indicate that the Group VIII metals, while functioning as the source of hydrogen atoms, also tend to promote dehydrogenation, particularly of the higher molecular weight components of the feed, which leads to coke formation at the processing conditions employed. The hydroprocessing art is, therefore, faced with the enigma of promoting activity with Group VIII metals while simultaneously sacrificing catalyst stability. My inventive concept affords a solution by providing a novel catalyst which utilizes the enhanced activity of Group VIII metals and minimizes the loss in catalyst stability.

The catalyst of my invention constitutes discrete particles of a mixture of (1) a porous, amorphous carrier material containing a Group VI–B metal component and (2) a porous, zeolite carrier material containing a Group VIII metal component. In employing the term "discrete" it is tended to connote homogeneous particles as distinguished from a mere indiscriminate, heterogeneous mixture of particles having varied physical characteristics and/or chemical compositions. By contrast, each particle of the catalyst of the present invention is substantially identical to every other particle.

CATALYST COMPOSITIONS

Those metallic components traditionally utilized in hydrocarbon conversion catalyst are intended for use in the present catalyst. Therefore, the Group VI–B metals include molybdenum, chromium and tungsten, while the Group VIII metals include iron, cobalt, nickel, platinum, palladium, iridium, ruthenium, rhodium and osmium. There is some evidence to indicate that other metals can be used in conjunction with, or instead of the Group VIII metals; these include rhenium, germanium and tin. Concentrations of the metallic components are computed as if the metals exist within the composite in an elemental state, and based upon the total composite, and will vary according to the metal as well as the process intended to be effected. Group VI–B metals are employed in quantities of from 4.0% to about 30.0%, and more often from about 5.0% to about 20.0%. The Group VIII metals may be divided into two sub-groups, with the iron-group components being present in an amount in the range of about 1.0% to about 10.0% by weight. Noble metals of Group VIII are utilized in lesser quantities of from about 0.01% to about 2.0% by weight, as are the other metal components, germanium, tin and rhenium.

As hereinabove set forth, the present catalyst utilizes a porous carrier material consisting of both amorphous and zeolitic substances. Considering first the porous, amorphous carrier, it is preferred that it be an absorptive support having a surface area of about 25 to about 700 square meters per gram. Suitable amorphous material is selected from the group of refractory inorganic oxides including alumina, titania, zirconia, magnesia, boria, and mixtures thereof, etc. One preferred amorphous carrier constitutes a composite of both alumina and silica, the latter in a concentration of about 10.0% to about 90.0% by weight. The Group VI–B metals are combined with the amorphous material in the aforesaid ranges, and in any manner suitably described in the prior art.

The Group VIII metal components as well as the other metals, are combined with a zeolitic carrier material which is commonly referred to in the art as a crystalline aluminosilicate. This may be naturally-occurring, or synthetically prepared, and includes phillipsite, erionite, mordenite, faujasite, Type A, Type L or Type U molecular sieves, etc. Zeolitic material may be prepared in any manner known to the prior art, such as by admixing solutions of sodium silicate and sodium aluminate, and allow the resulting mixture to react to form a solid crystalline aluminosilicate.

One particular method is especially preferred when the carrier material is intended to be a crystalline aluminosilicate. This stems from the fact that the method produces a carrier material of substantially pure crystalline aluminosilicate particles. In employing the term "substantially pure," the intended connotation is an aggregate particle at least 90.0% by weight of which is zeolitic. Thus, the carrier is distinguished from an amorphous carrier material, or prior art pills and/or extrudates in which the zeolitic material might be dispersed within an amorphous matrix with the result that only about 40.0% to about 70.0% by weight of the final particle is zeolitic. The preferred method of preparing the carrier material produces crystalline aluminosilicates of the faujasite modification, and utilizes aqueous solution of colloidal silica and sodium aluminate. After the solid crystalline aluminosilicate has been formed, the mother liquor is separated from the solids by methods such as decantation or filtration. The solids are water-washed and filtered to remove undesirable ions, and to reduce the quantity of amorphous material, and are then reslurried in water to a solids concentration of about 5.0% to about 50.0%. The cake and the water are violently agitated and homogenized until the agglomerates are broken and the solids are uniformly dispersed in what appears to be a colloidal suspension. The suspension is then spray dried by conventional means such as pressurizing the suspension through an orifice into a hot, dry chamber. The solid particles are withdrawn from the drying chamber and are suitable for forming into finished particles of desired size and shape. The zeolitic material may be utilized in the hydrogen or ammonium form, or in the sodium, potassium or magnesium form.

After the intended metal components have been combined with the respective carriers, dried and calcined in accordance with the prior art practices, the materials are reduced in size to a finely-divided powder, if not already existing as such. The two powders are intimely commingled by any suitable technique and extruded or pilled into the desired particle size. With respect only to the two porous carrier materials, exclusive of the metal components, the zeolitic material is employed in an amount in the range of about 5.0% to about 50.0% by weight, and preferably from about 5.0% to about 30.0% by weight.

As a result of the relatively small pore openings of the zeolitic material, the larger hydrocarbon molecules in the feed stock are prohibited from contact with the Group VIII metal component and cannot therefore, undergo dehydrogenation which, as previously stated, leads to the undesirable formation of coke and other carbonaceous products. However, hydrogen has complete access to the metal components, through diffusion, with the result that the necessary hydrogen atoms are produced and will diffuse out of the particle to enhance the rate of the hydroprocessing reaction. The ultimate beneficial effect is an increase in acceptable catalyst life, expressed as barrels of charge stock, exclusive of recycle, per pound of catalyst disposed within the hydroprocessing reaction zone.

As stated in the present specification and appended claims, the concentration of the various metallic components are computed as if existing in the elemental state, and are based upon the weight of the entire catalytic composite. With respect to the stated concentrations of the amorphous and zeolitic carriers, they are computed on the basis of only the carrier material, and are exclusive of the metal components.

PROCESSES AND CHARGE STOCKS

The various charge stocks, contemplated for processing over the catalyst of my invention, are characterized by varying boiling ranges as well as identity of contaminating influences. With respect to the latter, the most prevalent contaminants are sulfurous and nitrogenous compounds, and in regard to extremely heavy feed stocks, organo-metallic compounds and higher molecular weight asphaltenes. While most contemplated feed stocks contain one or more of these contaminants, it is not intended to exclude those charge stocks substantially free therefrom. It is within the scope of the present invention to consider other charge stock components as contaminants depending upon the ultimately intended use and end result. For example, in a process for improving the jet fuel characteristics of kerosene boiling range fractions (300° F. to 550° F.), aromatic hydrocarbons are considered contaminants from the view of smoke point, and must be converted to saturates in order to elevate the smoke point. Similarly, pyrolysis naphthas are rich in aromatics, but are "contaminated" by the inclusion of mono- and diolefins which must be selectively saturated before known extraction techniques can be used for aromatic recovery.

Therefore, contaminated charge stocks, the processing of which is subject to improvement through the use of my invention, include naphtha boiling range (400° F.–450° F. maximum end point) fractions which are intended for aromatic recovery, or subsequent catalytic reforming; kerosene fractions which are intended for use as jet fuel, or as charge to hydrocracking systems; light and heavy gas oils subsequently serving as fuel oils, or hydrocracking feed stocks; and, severely contaminated black oils—e.g. containing non-distillable hydrocarbons boiling above 1050° F.—which must be converted and decontaminated in order for subsequent processing or direct use—e.g. as fuel oil. In many situations, it will be desirable to effect hydrogenative cracking to lower-boiling hydrocarbon products while simultaneously decontaminating. This is readily accomplished through the use of the present catalyst, and leads to still another advantageous result. Where a gas oil—boiling above say 600° F.—is intended for conversion into jet fuel components boiling in the range of 300° F. to 550° F., two forms of hydrogenative cracking are effected, in addition to decontamination reactions. The higher boiling material is hydrocracked into the lower boiling products and the lower boiling cyclic hydrocarbons succumb to ring-opening and saturation within the jet fuel range, without significant cracking into still lower-boiling material.

The operating conditions imposed upon the reaction zone, or zones, are primarily dependent upon the particular hydroprocess being effected and the characteristics of the fresh feed charge stock. In general, however, these operating conditions will include a pressure from about 400 to 5,000 p.s.i.g., a liquid hourly space velocity of about 0.1 to 10.0, and defined as volumes of hydrocarbon charged per hour, per volume of catalyst disposed in the reaction zones, and a hydrogen concentration within the range of about 1,000 to about 50,000 s.c.f./bbl. In view of the fact that the reactions being effected are exothermic in nature, an increasing temperature gradient is experienced as the hydrogen and feed stock traverse the catalyst bed. For any of the hydrogen-consuming processes, it is desirable to maintain the maximum catalyst bed temperature at a level below about 900° F., and preferably at 850° F. Temperatures will be in the range of 200° F. to 900° F., and it is intended herein that the stated temperature of operation connotes the maximum catalyst bed temperature. To assure that the bed temperature does not exceed the maximum allowable for a given process, conventional quench streams, either normally liquid or vaporous, may be introduced at a lower temperature into one or more intermediate loci of the catalyst bed.

In some of the hydroprocesses encompassed by the present invention, that portion of the normally liquid product effluent boiling above the desired end point of the product will be recycled to the reaction zone. In these cases, the combined liquid feed ratio (defined as volumes of total liquid feed to the reaction zone per volume of fresh feed charge) will lie in the range of about 1.1 to about 6.0.

ILLUSTRATIVE EXAMPLES

These examples are presented herein for the purpose of further illustrating the catalyst and processes of the present invention, and of indicating the beneficial results attendant the use thereof. It is not intended that the examples be construed as limiting the present invention, the scope and spirit of which is defined by the appended claims.

EXAMPLE I

A heavy vacuum gas oil, boiling from 650° F. to about 1050° F. is intended for decontamination and conversion into a low-sulfur furnace oil having a boiling range of 350° F. to 685° F. and a maximum pour point of 0° F. The charge stock has a gravity of 23.4° API, contains 1.57% by weight of sulfurous compounds, as elemental sulfur, and 956 p.p.m. of total nitrogen. Since a considerable portion of this charge stock must be converted into lower-boiling material, the conversion catalyst is selected to possess hydrocracking activity in addition to desulfurization activity.

The catalyst is a composite of an amorphous alumina-silica carrier (37.0% by weight of silica), containing a tungsten component, and zeolitic faujasite containing ion-exchanged nickel. With respect only the carrier, the concentration of the zeolitic material is about 20.0% by weight. Process operating conditions include a pressure of 2,500 p.s.i.g. a maximum catalyst bed temperature of 850° F., a hydrogen concentration of 10,500 s.c.f./bbl. and a liquid hourly space velocity of 0.55, based upon a fresh feed charge rate of about 10,000 bbl./day. That portion of the normally liquid product effluent boiling above the 685° F. end point of the desired furnace fuel is recycled to the reaction zone in an amount which provides a combined liquid feed ratio of 1.30. Hydrogen consumption is about 2.14% by weight of fresh feed or 1,290 s.c.f./bbl. Product yield and component distribution is presented in the following Table I:

TABLE I.—FURNACE OIL YIELD AND PRODUCT DISTRIBUTION

| Component | Percent of— | |
|---|---|---|
| | Weight | Volume |
| Ammonia | 0.30 | |
| Hydrogen sulfide | 1.67 | |
| Methane | 0.35 | |
| Ethane | 0.57 | |
| Propane | 1.13 | |
| Butanes | 2.26 | 3.58 |
| Pentanes | 1.82 | 2.65 |
| Hexanes | 2.28 | 3.01 |
| Heptane, 350° F | 14.21 | 17.22 |
| 350° F.–685° F | 77.55 | 85.93 |

The desired furnace fuel fraction has a gravity of 401° API, a pour point of −25° F., a flash point of 125° F. and contains less than about 5.0 p.p.m. of sulfur. With respect to the heptane-350° F. naphtha, the gravity is 56.2° API and the sulfur concentration is less than 1.0 p.p.m. by weight; component analyses indicate 40.0% paraffins, 53.0% naphthenes and 7.0% aromatics. It will be recognized that this side-product stream constitutes a suitable charge to a catalytic reforming unit to enhance the motor fuel characteristics thereof.

EXAMPLE II

This example is presented to illustrate the use of the present catalyst for improving the jet fuel characteristics of kerosene fractions. Principal reactions to be effected are the removal of 160 p.p.m. by weight of sulfur and about 8.0 p.p.m. by weight of nitrogen, while simultaneously saturating aromatic hydrocarbons. The charge stock is 4,250 bbl./day of a straight run kerosene fraction having a gravity of 41.0° API, an initial boiling point of 284° F. and an end boiling point of 500° F. Analyses indicate 13.0% paraffins, 64.0% naphthenes and 23.0% aromatics; the smoke point of the feed stock is about 18.5 mm.

A two-stage process is utilized, in the first stage of which sulfur and nitrogen are removed. The ultimate product is intended to contain less than 5.0% by volume of aromatics and have a smoke point above about 25.0 mm. Within the first stage, the operating conditions include a pressure of about 450 p.s.i.g., a maximum catalyst bed temperature of 750° F. and a liquid hourly space velocity of 8.0, with the hydrogen concentration being 500 s.c.f./bbl. The catalyst is a composite of alumina, impregnated with 7.0% by weight of molybdenum, and 10.0% by weight of a faujasitic zeolite which has been ion-exchanged with 3.5% by weight of nickel. As a result of the relatively low sulfur and nitrogen content of the fresh feed, the hydrogen consumption is only about 50 s.c.f./bbl.

The second-stage operation is effected at conditions conducive to aromatic saturation and include an elevated pressure of 800 p.s.i.g., a maximum catalyst bed temperature of about 650° F., a hydrogen concentration of 4,250 s.c.f./bbl. and a liquid hourly space velocity of 4.0. The catalyst comprises alumina, containing 10.0% by weight of molybdenum, and 15.0% by weight of Type A molecular sieves containing 0.375% by weight of platinum. The feed stock is the hexanes-and-heavier portion of the first stage product, following removal of 0.2% by volume butanes and pentanes, and 0.08% by weight of normally gaseous components. The kerosene product has a gravity of 43.1° API and a smoke point of 33.0 mm., and contains less than 1.0 p.p.m. of sulfur and about 0.8% by volume of aromatics.

EXAMPLE III

A blend of 4,000 bbl./day of light cycle oil, 5,000 bbl./day of a pyrolysis light gas oil and 3,000 bbl./day of a coker gas oil is intended for maximum conversion into a heptane-350° F. naphtha for subsequent processing in a catalytic reforming unit. The blended charge stock has a gravity of about 12.4° API, an initial boiling point of 300° F. and an end boiling point of 800° F., and contains 7,300 p.p.m. of sulfur and about 840 p.p.m. of nitrogen. A two-stage system is utilized, the first stage of which serves to effect the destructive removal of sulfurous and nitrogenous compounds. The first stage catalyst is a composite of alumina and 37.0% by weight of silica, containing 16.0% by weight of molybdenum, and 15.0% of a faujasitic zeolite containing 1.8% by weight of nickel. Operating conditions include a pressure of about 1,850 p.s.i.g., a maximum catalyst bed temperature of 850° F., a hydrogen concentration of 11,000 s.c.f./bbl. and a liquid hourly space velocity of 1.23. Hydrogen consumption is about 3.20% by weight of the fresh feed, or 2,076 s.c.f./bbl.

The product effluent is admixed with about 7,200 bbl./day of 350° F.-plus recycle liquid, to provide a combined liquid feed ratio of 1.6, and processed over a hydrocracking catalyst of a carrier of 25.0% by weight of alumina and 75.0% by weight of silica, containing 5.0% by weight of tungsten, and 25.0% by weight of a faujasitic carrier (92.3% of which is zeolitic), containing 0.75% by weight of palladium. Operating conditions include a hydrogen concentration of about 17,000 s.c.f./bbl., a liquid hourly space velocity of 0.5, a pressure of 1,750 p.s.i.g. and a maximum catalyst bed temperature of 800° F. Hydrogen consumption in this second stage is 3.1% by weight of fresh feed, or 2,014 s.c.f./bbl. Overall product distribution and component yields are presented in the following Table II:

TABLE II.—HYDROCRACKING PRODUCT YIELD AND DISTRIBUTION

| Component | Percent of— | |
| --- | --- | --- |
| | Weight | Volume |
| Ammonia | 0.10 | |
| Hydrogen sulfide | 0.78 | |
| Methane | 0.24 | |
| Ethane | 0.59 | |
| Propane | 4.74 | |
| Butanes | 12.39 | 21.32 |
| Pentanes | 13.18 | 20.73 |
| Hexanes | 14.23 | 19.15 |
| Heptane, 350° F | 60.05 | 71.27 |

The foregoing specification and examples indicate the method of employing the catalyst of the present invention and the benefits afforded through the utilization thereof.

I claim as my invention:

1. A desulfurization catalyst in pilled or extruded form comprising discrete particles of a mixture of (1) a Group VI–B metal-containing carrier material consisting essentially of a porous, amorphous carrier material and a Group VI–B metal present in an amount of from 4.0% to about 30.0% by weight of the catalyst and selected from the group consisting of molybdenum and tungsten, and (2) a porous zeolitic carrier material ion-exchanged with an iron group metal, said iron group metal being present in amount of from 1.0% to 10.0% by weight of the catalyst.

2. The catalyst of claim 1 further characterized in that said iron-group metal component is a nickel component.

3. The catalyst of claim 1 further characterized in that said iron-group metal component is a cobalt component.

4. The catalyst of claim 1 further characterized in that said porous, amorphous carrier material is alumina.

5. The catalyst of claim 1 further characterized in that said porous, amorphous carrier material is a composite of alumina and from 10.0% to 90.0% by weight of silica.

6. The catalyst of claim 1 further characterized in that said zeolitic carrier material is mordenite.

7. The catalyst of claim 1 further characterized in that said zeolitic carrier material is faujasite.

8. The catalyst of claim 7 further characterized in that said faujasitic carrier material is more than 90.0% by weight zeolitic.

9. A desulfurization hydroprocess which comprises reacting a sulfurous hydrocarbon charge stock with hydrogen at desulfurizing conditions in contact with a desulfurization catalyst in pilled or extruded form comprising discrete particles of a mixture of (1) a Group VI–B metal-containing carrier material consisting essentially of a porous, amorphous carrier material and a Group VI–B metal present in an amount of from 4.0% to about 30.0% by weight of the catalyst and selected from the group consisting of molybdenum and tungsten, and (2) a porous zeolitic carrier material ion-exchanged with an iron group metallic component, said iron group metal being present in an amount of from 1.0% to 10.0% by weight of the catalyst.

(References on following page)

References Cited

UNITED STATES PATENTS

| | | | |
|---|---|---|---|
| 3,287,252 | 11/1966 | Young | 208—110 |
| 3,304,254 | 2/1967 | Eastwood et al. | 252—455 Z |
| 3,312,615 | 4/1967 | Cramer et al. | 208—110 |
| 3,360,458 | 12/1967 | Young | 208—110 |
| 3,494,857 | 2/1970 | McIlvried et al. | 208—143 |
| 3,580,837 | 5/1971 | Pollitzer | 260—677 H |
| 3,597,349 | 8/1971 | Bertolacini et al. | 252—455 Z |
| 3,617,490 | 11/1971 | Csicsery | 252—455 Z |

DANIEL E. WYMAN, Primary Examiner

A. P. DEMERS, Assistant Examiner

U.S. Cl. X.R.

208—110, 216, 217, 255; 252—455 Z; 260—677 H, 683.9